(12) United States Patent
Förtsch et al.

(10) Patent No.: US 8,518,366 B2
(45) Date of Patent: Aug. 27, 2013

(54) DEVICE AND METHOD FOR THE COMBUSTION OF SULFUR AND SULFUR-CONTAINING COMPOUNDS

(75) Inventors: Dieter Förtsch, Leichlingen (DE); Martin Kürten, Bergisch Gladbach (DE)

(73) Assignee: Bayer Intellectual Property GmbH, Monheim (DE)

( * ) Notice: Subject to any disclaimer, the term of this patent is extended or adjusted under 35 U.S.C. 154(b) by 0 days.

(21) Appl. No.: 13/512,158

(22) PCT Filed: Oct. 28, 2010

(86) PCT No.: PCT/EP2010/066306
§ 371 (c)(1),
(2), (4) Date: Jun. 1, 2012

(87) PCT Pub. No.: WO2010/067044
PCT Pub. Date: Jun. 9, 2011

(65) Prior Publication Data
US 2012/0244064 A1    Sep. 27, 2012

(30) Foreign Application Priority Data

Dec. 1, 2009 (EP) .................................... 09014862
Apr. 22, 2010 (DE) .......................... 10 2010 018 172
Sep. 9, 2010 (DE) .......................... 10 2010 040 482

(51) Int. Cl.
*B01J 12/00* (2006.01)
*B01J 19/00* (2006.01)
*C01B 17/54* (2006.01)
*F23C 6/00* (2006.01)

(52) U.S. Cl.
USPC ........... 423/542; 423/543; 422/643; 422/644; 422/646; 422/647; 431/356

(58) Field of Classification Search
USPC ................. 423/542, 543; 422/643, 644, 646, 422/647; 431/356
See application file for complete search history.

(56) References Cited

U.S. PATENT DOCUMENTS 3,803,297 A    4/1974    Guth et al.
3,803,298 A    4/1974    Guth et al.
(Continued)

FOREIGN PATENT DOCUMENTS
DE    1 032 722    6/1958
DE    1032722 B    6/1958
(Continued)

OTHER PUBLICATIONS

International Search Report for PCT/EP2010/066306 Mailed May 13, 2011.

*Primary Examiner* — Timothy Vanoy
(74) *Attorney, Agent, or Firm* — Baker Donelson Bearman Caldwell & Berkowitz, PC (57) ABSTRACT

The present invention relates to a process and a device for the combustion of sulphur and/or sulphur-containing compounds, via which a sufficient production of $SO_2$-containing gases having a high $SO_2$ concentration is made possible. The combustion preferably proceeds using a combustion gas which has an oxygen fraction at least as high as air, but preferably a higher fraction of oxygen. The process and the device should be suitable, in particular, for providing sulphur dioxide as a source for further production of sulphuric acid or highly concentrated $SO_3$-containing gases. In addition, the device and the process should be suitable for oxidizing hydrogen-sulphide-containing gases, such as occur, for example, in the refinery industry, in high concentrations to $SO_2$.

19 Claims, 6 Drawing Sheets

(56) References Cited

U.S. PATENT DOCUMENTS

| | | |
|---|---|---|
| 3,936,275 A | 2/1976 | Perret et al. |
| 5,389,354 A | 2/1995 | Braendle et al. |
| 5,807,530 A | 9/1998 | Anderson |
| 6,893,622 B2 | 5/2005 | Eichenhofer et al. |
| 7,754,915 B2 | 7/2010 | Herold et al. |
| 2003/0077217 A1 | 4/2003 | Eichenhofer et al. |
| 2010/0092374 A1 | 4/2010 | Erkes et al. |
| 2012/0244064 A1* | 9/2012 | Fortsch et al. ............... 423/542 |

FOREIGN PATENT DOCUMENTS

| | | |
|---|---|---|
| DE | 1948754 A1 | 5/1971 |
| DE | 4002465 A1 | 8/1991 |
| DE | 10351808 A1 | 5/2004 |
| EP | 1262451 A2 | 12/2002 |
| EP | 1295849 A2 | 3/2003 |
| EP | 1526129 A1 | 4/2005 |
| WO | 9532149 A1 | 11/1995 |
| WO | 2007090671 A2 | 8/2007 |
| WO | 2008052649 A1 | 5/2008 |

\* cited by examiner

DEVICE AND METHOD FOR THE COMBUSTION OF SULFUR AND SULFUR-CONTAINING COMPOUNDS

CROSS REFERENCE TO RELATED APPLICATIONS

This application is a §371 National Stage Application of PCT/EP2010/066306, filed Oct. 28, 2010, which claims priority to European Application No. 09014862.8, filed Dec. 1, 2009; German Application No. 10 2010 018 172.2, filed Apr. 22, 2010; and German Application No. 10 2010 040 482.9, filed Sep. 9, 2010.

BACKGROUND OF THE INVENTION

1. Field of the Invention

The present invention relates to a process and a device for the combustion of sulphur and/or sulphur-containing compounds such as, e.g., hydrogen sulphide, with the formation of sulphur dioxide.

2. Description of Related Art

In the prior art, various devices and processes are described for burning sulphur or hydrogen-sulphide-containing gases.

The combustion of elemental sulphur plays an important role, for example, in the industrial production of sulphuric acid.

The combustion of hydrogen sulphide is of industrial importance, for example in the form of the Claus process or the Wet Sulphuric Acid (WSA) process.

To ensure complete combustion of sulphur to sulphur dioxide ($SO_2$), combustion usually proceeds in stoichiometric oxygen excess. This superstoichiometric combustion is described, for example, in Ullmann's Encyclopaedia of Industrial Chemistry, 5th Edition, 1994, Vol. A25, pp. 574 ff. The combustion proceeds there in a horizontally arranged cylindrical furnace which has a refractory lining and on its end side comprises a centrally arranged burner system. The liquid sulphur is atomized and mixed with the combustion air. The combustion chambers are designed to be adiabatic, i.e. there is no removal of heat from the combustion chamber.

In general, it is true that with an oxygen excess, the adiabatic flame temperature increases with increasing concentrations of sulphur and oxygen in the starting materials. For combustion temperatures above 1100° C., the formation of what are termed thermal nitrogen oxides ($NO_x$) greatly increases. In order to avoid the formation of thermal nitrogen oxides, in WO2007/090671A2, a two-step combustion is proposed. The sulphur in this case is all added at the end side of the combustion chamber. The addition of the combustion air is divided into two steps. In the first step, substoichiometric combustion of the sulphur proceeds, i.e. under an oxygen deficit. The reducing conditions prevent the formation of $NO_x$. In the second step directly following the first step, by further addition of air the remaining amount of sulphur is subjected to afterburning in an oxygen excess.

In DE1948754A1, a two-step combustion is likewise proposed, in which the first step proceeds substoichiometrically, and the second step proceeds superstoichiometrically with respect to oxygen. The combustion proceeds adiabatically in steps 1 and 2. Between the steps, the gas mixture is cooled by way of a heat exchanger.

Usually, the adiabatic combustion chamber is connected to a waste-heat boiler via an opening. The reaction gas is first cooled in the waste-heat boiler, preferably with steam recovery (see, e.g., WO2007/090671A2).

The design criteria of conventional adiabatic combustion chambers for the combustion of sulphur are based on the flame length and the diameter of the flame. The combustion chamber is dimensioned in such a manner that complete exhaustive combustion of the sulphur to $SO_2$ proceeds, and so no unreactive sulphur leaves the combustion chamber and can enter the downstream flue gas cooling (WO2007/090671A2).

Exhaustive combustion is customarily ensured by correspondingly long residence times with a sufficiently high temperature in the adiabatic combustion chamber. This requirement determines the size of the combustion chamber and the temperature profile (which is virtually constant downstream of the flame in the case of adiabatic combustion chambers). The requirement for complete exhaustive combustion is generally justified by the statement that otherwise damage would be feared in the region of the boiler (see, e.g., WO1995/32149A1 or WO2007/090671A2).

EP1295849B1 is concerned with the low-temperature combustion of sulphur in air. Special measures are taken in order not only to eliminate amounts of $NO_x$ already present in the starting material, but also to avoid amounts of thermal $NO_x$ formed by combustion in air. All of the combustion air is added at the bottom of a combustion chamber and the sulphur is fed in a plurality of, preferably two, steps, perpendicular to the direction of flow of the combustion air. The combustion temperature is kept in a range between 500° C. and 700° C. Sulphur is atomized via a plurality of special pulsed fan nozzles distributed peripherally on the circumference of the combustion chamber perpendicularly to the flow of the low-turbulence combustion air flowing in at the same velocity. Between the combustion zones, heat uncoupling proceeds. Only combustion with air is described, optionally with addition of $SO_2/NO_x$-containing gases.

DE4002465A1 describes that amounts of $NO_x$ already present in the reaction gas can be reduced by addition of sulphur in an adiabatic combustion chamber.

Using air which contains 20.95% by volume of oxygen, with stoichiometric combustion of sulphur, theoretically an $SO_2$-containing gas having a maximum of 20.5% by volume of $SO_2$ may be obtained. The largest component of the $SO_2$-containing gas is nitrogen. Usually, the resultant $SO_2$ is further oxidized to $SO_3$ in a catalytic process in order to obtain sulphuric acid. A high nitrogen fraction in the $SO_2$-containing gas is unfavourable, inter alia, because it leads to large apparatus dimensions and high fan outputs.

The current contact processes in addition permit gases having a sulphur dioxide concentration of up to 66% by volume to be fed in (WO2008/052649A1).

With regard to reducing the fraction of unwanted nitrogen in the product gas of the combustion and with regard to an efficient and compact plant for further processing the sulphur dioxide produced (e.g. to form sulphuric acid), it would therefore be desirable to carry out the combustion in a combustion gas that is enriched with oxygen compared with air. The combustion of sulphur and sulphur-containing compounds such as, for example, hydrogen sulphide, in an oxygen-rich combustion gas, however, causes some technical problems.

Increasing the oxygen concentration causes an increase in the adiabatic flame temperature. High flame and flame point temperatures can lead to damage (burning off) of the nozzles and increase the formation of $NO_x$ in the flame.

In addition, damage to the combustion chamber wall, which usually contains iron, must be feared. In order, for example, to prevent the formation of iron(II) sulphide FeS, iron(II) disulphide ($FeS_2$) or iron(III) sulphide ($Fe_2S_3$), the combustion chamber wall temperature should be below 480° C. On the other hand, the combustion chamber wall temperature should be above the dew point of sulphuric acid. The sulphuric acid dew point is dependent on the $SO_3$ concentration and the $H_2O$ concentration in the flue gas, wherein the $SO_3$ concentration in turn is dependent on the concentrations of $SO_2$ and $O_2$, and also on the temperature and residence time, wherein catalytically active substances can also be of importance.

As already discussed, in addition, at relatively high temperatures, the formation of thermal $NO_x$ from molecular nitrogen ($N_2$) must be expected. The formation of thermal $NO_x$ is dependent, inter alia, on the temperature and the residence time. At high temperatures and a long residence time in the combustion zone, intensified nitrogen oxide formation proceeds. Since in the adiabatic combustion chambers customarily used for the combustion of sulphur, owing to the required exhaustive combustion, a long residence time is required, these types of combustion chamber are not efficient. In addition to this thermal $NO_x$, on combustion of sulphur-containing compounds from organic sources, the formation of $NO_x$ from chemically bound nitrogen (e.g. in ammonia or amines) can also be significant.

For reducing the temperature in the combustion chamber, it is proposed in Laid-Open Application DE10351808A1 to recirculate some of the resultant $SO_2$ for dilution of the reaction mixture. The combustion proceeds adiabatically, i.e. the temperature limitation is achieved solely by dilution of the combustion gas with $SO_2$. In the process resulting from this proposal, approximately 80% by weight of the $SO_2$ exiting from the combustion chamber is circulated as cycle gas. Owing to the high fraction of the cycle gas, high outputs of the fan and large apparatus dimensions and piping cross sections are necessary, which leads to an uneconomic process.

In U.S. Pat. No. 3,803,297, a process is described for producing sulphur trioxide and sulphuric acid, in which sulphur is first burnt with technical-grade oxygen in a multiplicity of successively following combustion steps to form $SO_2$. In the individual combustion steps, the combustion proceeds adiabatically. Between the combustion steps, cooling is performed. In the first combustion step, 5% to 40% of the total amount of the sulphur that is to be oxidized is mixed with half to all of the molar amount of recirculated sulphur trioxide. The addition of sulphur trioxide effects a cooling in the combustion. The high combustion temperatures during the combustion of sulphur effect a decomposition of sulphur trioxide to sulphur dioxide and oxygen with takeup of heat. However, recirculating sulphur trioxide that has already been obtained is inefficient from economic aspects. In addition, the adiabatic combustion is unfavourable, since the heat development can only be controlled via the gas composition. Since the purpose is to burn the starting materials at high concentrations, a correspondingly high number of intermediate cooling stages is necessary between the combustion steps, in order to limit the temperatures to a required maximum value of 2000°.

The combustion of sulphur-containing compounds, in particular of hydrogen-sulphide-containing compounds, in addition, plays an important role in the workup of off-gases from the refinery industry. Fossil fuels, such as natural gas, coal, oil sand, oil shale and petroleum contain organic and inorganic sulphur compounds.

The removal of these sulphur compounds is necessary not only for the further processing of the raw material but serves especially for reducing air impurities. The legal requirements for the residual amounts of sulphur compounds in off-gases have increased considerably in recent years.

For the removal of sulphur compounds from fuels and combustion products, a multiplicity of physical and chemical conversion processes exist.

In the case of solid fuels, the sulphur compounds, after the combustion in the power plant, are absorbed as sulphur dioxide by a flue gas desulphurization, e.g. by means of milk of lime, and converted into calcium sulphite. By oxidation with residual oxygen present in the off-gas, the end product gypsum is formed.

In the case of liquid fuels (e.g. diesel fuel or light heating oil), maximum permissible sulphur contents are prescribed. These fuels are desulphurized as early as in the refineries. The sulphur compounds present in the crude oil are recovered after the distillation, wherein what is termed the heavy oil fraction has the highest sulphur concentrations. Desulphurization customarily proceeds using gaseous hydrogen. The organic sulphur compounds are converted into hydrogen sulphide in this process. Then, the hydrogen sulphide is removed, for example by means of an amine scrubber. In the amine scrubber, the hydrogen-sulphide-containing process gas termed acid gas (or sour gas) is bound to an amine in an absorber. A gas substantially freed from $H_2S$ (sweet gas) and an $H_2S$-loaded amine solution are formed. In the regenerator, thermal separation of the acid components from the amine proceeds, in such a manner that the amine can again be used for scrubbing. The concentrated hydrogen-sulphide-containing gas has $H_2S$ concentrations up to 90% by volume. This gas is customarily used for obtaining sulphur by the Claus process.

In the petrochemical industry, in addition, what is termed Sour Water Stripper Gas (SWSG) arises, which has a composition of roughly equal molar fractions of hydrogen sulphide, water and ammonia.

Also, in the combustion of coal or heavy oil in power plants in which the fuel is gasified in advance in an oxygen deficit, a hydrogen-sulphide-containing synthesis gas is formed which is purified before the combustion.

Hydrogen sulphide, in addition, is present in differing concentrations in petroleum-associated gas and in natural gas having a fraction of up to 30% by volume, and in the off-gas of sewage treatment plants having a fraction of up to 5% by volume.

The industrial use of hydrogen sulphide is limited. Therefore, it is usually first converted into elemental sulphur and then into sulphuric acid.

If the hydrogen sulphide is present in the off-gas in concentrated form, i.e. at contents of greater than 20% by volume, the production of sulphur by what is termed the Claus process is economic.

The Claus process comprises the following reaction steps:

$$2H_2S + 3O_2 \rightarrow 2SO_2 + H_2O$$

$$2H_2S + SO_2 \rightarrow 3S + 2H_2O$$

Industrially, sulphur generation proceeds by the Claus process in a plurality of steps. In a first step, $H_2S$ is burnt to $SO_2$ in a combustion apparatus. A majority of the resultant $SO_2$ already reacts in the combustion apparatus with remaining $H_2S$ to form sulphur. After separating off the sulphur, one or more catalytic steps follow for the further reaction of $H_2S$ with $SO_2$.

In the Claus process, maintaining the stoichiometry is important, since otherwise excess $SO_2$ or $H_2S$ can pollute the environment.

In addition, the reaction of $H_2S$ with $SO_2$ in the Claus process proceeds in an incomplete manner. In order to increase the degree of sulphur retention further, various processes have been developed which free the off-gas from sulphur compounds downstream of the catalytic steps. The best known is what is termed Shell Claus Off-gas Treating (SCOT) process.

The majority of the sulphur obtained from the $H_2S$-containing off-gases is further processed to sulphuric acid. Therefore, under some circumstances, it is advantageous to burn hydrogen sulphide directly to form sulphur dioxide and then immediately further oxidize it to sulphur trioxide and not to follow the detour via sulphur (Claus process).

What is termed the Wet Sulphuric Acid (WSA) process converts hydrogen-sulphide-containing off-gases directly to sulphuric acid. In this case the hydrogen-sulphide-containing gas is first burnt and the water- and sulphur-dioxide-containing gas is then fed to a catalytic oxidation. The resultant $SO_3$ reacts with the water present to form gaseous $H_2SO_4$. Liquid $H_2SO_4$ is then obtained by condensation of the gaseous sulphuric acid. The combustion of $H_2S$ proceeds with air in the uncooled, i.e. adiabatic, combustion furnace (Sulphur 312, September/October 2007, pages 80-85).

In addition to hydrogen-sulphide-containing gases, in the petrochemical industry a number of further sulphur-containing off-gases also arise, which likewise must be treated on account of the environmental guidelines (e.g. German Federal Air Pollution Prevention Law).
Those which may be mentioned are, for example, sulphur-containing off-gases from calcination processes which have a relatively high concentration of $SO_2$ (up to 10 000 ppm).
In addition, high amounts of flue gases occur in combustion processes, which likewise can have considerable concentrations of $SO_2$. These are customarily treated to date according to the abovementioned flue gas desulphurization, e.g. with milk and lime, in which large amounts of gypsum are produced.

The off-gas arising in the petroleum-processing industry in the regeneration step of a fluid catalytic cracker, in addition to significant fractions of $SO_2$, contains, as sulphur-containing compound, further fractions of oxidizable components such as carbon monoxide and also relatively high fractions of nitrogen oxides, and so here also afterburning is required.

SUMMARY

Proceeding from the described prior art, the technical object is to provide a process and a device for burning sulphur and/or sulphur-containing compounds, in particular hydrogen-sulphide-containing gases, via which an sufficient production of $SO_2$-containing gases having a high $SO_2$ concentration is made possible. The combustion should preferably proceed using a combustion gas which has an oxygen fraction at least as high as air, but preferably a higher fraction of oxygen. The process and the device should be suitable, in particular, for providing sulphur dioxide as a source for further production of sulphuric acid or highly concentrated $SO_3$-containing gases. In addition, the device and the process should be suitable for oxidizing hydrogen-sulphide-containing gases, such as occur, for example, in the refinery industry, in high concentrations to $SO_2$.

This object is achieved by the subjects of independent Claims 1 and 10. Preferred embodiments may be found in the dependent claims.

DETAILED DESCRIPTION OF A PREFERRED EMBODIMENT

The present invention therefore first relates to a device, hereinafter termed combustion apparatus, for the continuous combustion of sulphur and/or a sulphur-containing compound, with formation of sulphur dioxide.

The present invention further relates to a process for the continuous combustion of sulphur and/or a sulphur-containing compound, with formation of sulphur dioxide. The process according to the invention is carried out in the combustion apparatus according to the invention.

A continuous process in the context of this invention is a process in which the feed of the starting materials into a reactor and the discharge of the products from the reactor take place at the same time but separated in space, whereas in a discontinuous process, the reaction sequence addition of the starting materials, chemical reaction, and discharge of the products proceed one after another in time. The continuous procedure is of economic advantage, since down times of the reactor as a consequence of filling and emptying processes and long reaction times, e.g. as a consequence of safety provisions or as a consequence of heating and cooling processes, as occur in batch processes, are avoided.

Elemental sulphur can be present in various states of matter (solid, liquid, gaseous) and/or modifications (for example orthorhombic or monoclinic sulphur), depending on the ambient conditions such as pressure and temperature. When sulphur or elemental sulphur is mentioned here, no distinction is made between such modifications; rather, all conceivable states of matter, modifications and mixtures thereof come under the expressions used here. The same applies to all other substances cited here.

A sulphur-containing compound is taken to mean a substance or a substance mixture which can be reacted with oxygen with the formation of sulphur dioxide. Examples of sulphur-containing compounds are hydrogen sulphide ($H_2S$), carbon disulphide ($CS_2$) and carbonyl sulphide (COS).

As a generalized expression which comprises not only the expression sulphur but also sulphur-containing compound, the expression sulphur compound is used here.

The combustion of elemental sulphur has the advantage that, apart from the desired sulphur dioxide, no further products occur. Therefore, as starting material, in a preferred embodiment, a substance having a high fraction of at least 90% by weight, particularly preferably at least 95% by weight, very particularly preferably at least 98% by weight, of elemental sulphur is used. For comparisons in this context see Example 1 (combustion of sulphur with air) and Example 2 (combustion of sulphur with oxygen).

In a further preferred embodiment, as starting material, a substance having a fraction of at least 30 mol %, preferably at least 60 mol %, particularly preferably at least 80 mol %, of hydrogen sulphide is used. It is conceivable, for example, that the starting material is an off-gas as occurs downstream of the amine scrubber in a refinery (see, e.g. A. J. Kidnay, William R.

Parrish: Fundamentals of Natural Gas Processing, CRC Press, 2006). Such off-gases usually have a fraction of 80-90 mol % $H_2S$ and are here termed amine acid gas (AAG). Further components are usually $CO_2$, $H_2O$, $N_2$, hydrocarbons and/or amines A further possible feedstock, which can be present at least in part in the starting material, is the gas resulting from a sour-water stripper which has approximately the molar composition ⅓ $H_2S$, ⅓ $H_2O$ and ⅓ $NH_3$. This is also called sour water stripper off-gas (see, for example, Arthur Kohl, Richard Nielsen: Gas Purification, Fifth Edition, Gulf Publishing Company, 1997). For comparisons therewith see Example 3 (combustion of sulphur-containing gases with air) and Example 4 (combustion of sulphur-containing gases with oxygen).

In a preferred embodiment, different sulphur compounds are burnt together.

The combustion according to the invention of sulphur compounds proceeds with a combustion gas, e.g. with air. In a preferred embodiment, the combustion gas has a higher fraction of oxygen than air. The fraction of oxygen is at least 20%, preferably at least 40%, particularly preferably at least 70%, very particularly preferably at least 90%, most preferably at least 95%. Usual other components are $CO_2$, noble gases, nitrogen and/or water.

The product which is formed on the combustion of sulphur compounds in the combustion gas, and which product contains substantially $SO_2$ and unreacted amounts of oxygen, is here called reaction gas. Other components of the reaction gas can be, e.g. nitrogen, carbon dioxide, sulphur trioxide and water.

The combustion proceeds in a combustion apparatus. The combustion apparatus according to the invention comprises at least one inlet for the combustion gas and at least one outlet for the reaction gas obtained. Between the inlet and the outlet are situated at least two successively following combustion zones. The combustion gas is conveyed through the inlet into the combustion apparatus and passes successively through the combustion zones. In the combustion zones, one or more sulphur compounds are injected into the combustion gas and burnt.

The combustion apparatus according to the invention is provided with means for cooling, such that the heat produced in the combustion can be removed. In contrast to most combustion apparatuses described in the prior art for the combustion of sulphur compounds, the combustion apparatus according to the invention is constructed so as to be non-adiabatic. The combustion apparatus according to the invention is thereby not subject to the restriction that the heat produced in the combustion can only be controlled via the gas composition. Instead, it is possible to remove the heat where it is produced. Preferably, the cooling proceeds in two different ways: a wall cooling and what is termed intercooling. In wall cooling, the wall of the combustion apparatus is cooled. The heat removal from a combustion zone proceeds in this case principally via radiation. In addition, the combustion is divided among different combustion zones within the combustion apparatus. One or more heat exchangers for removing heat of reaction is/are connected downstream of each combustion zone (intercooling). Here, the heat removal proceeds principally via convection. All combustion zones are thereby constructed so as to be non-adiabatic.

The expression combustion zone must not be taken to mean that the combustion of a sulphur compound proceeds exclusively in such a zone. Rather, the combustion zone is defined in that the addition of at least one sulphur compound into the combustion gas and the ignition of the sulphur compound proceeds there. In order to handle the heat of combustion and to restrict the temperature in the combustion apparatus to a maximum value of 2000° C., the addition of one or more sulphur compounds proceeds according to the invention at different points within the combustion apparatus, between which the reaction gas is cooled; in addition, the wall of the combustion apparatus is cooled. The combustion can therefore take place completely over the entire volume of the combustion apparatus, that is to say also between two combustion zones.

The combustion apparatus according to the invention is preferably a wall-cooled water-tube boiler (tube-bridge-tube construction). Water-tube boilers are known from the prior art to those skilled in the art of energy technology and chemical engineering (see, e.g., Dubbel interactive, Taschenbuch für den Maschinenbau [Handbook of mechanical engineering], L.6.1.1.). The intensive cooling of the walls means that the surface temperature of the metal wall remains below the temperature characterized by iron-sulphide formation of about 480° C., even if temperatures of up to 2000° C. prevail in the combustion zones. The wall temperatures are preferably in the range from 200° C. to 400° C., preferably in the range from 240 to 350° C. For reduction of the heat removal via the wall, the tube-bridge-tube construction can also be lined.

As described, means for cooling the reaction gas are connected downstream of the individual combustion zones. For cooling, heat exchangers, for example, are used. The heat exchangers connected downstream of the individual combustion zones preferably use liquid water, a two-phase water-steam mixture and/or steam for cooling. The heat of reaction can be used, for example, for generating high-pressure steam at, e.g., 30 bar or 80 bar.

Preferably, all, or at least a majority, of the combustion gas is conveyed through one or more inlets at one end of the combustion apparatus into it. This means that the amount of oxygen which is required for complete combustion of the sulphur compounds in the successively following combustion zones is already completely or virtually completely fed to the first combustion zone. In all combustion zones the combustion proceeds in oxygen excess (i.e. superstoichiometrically with respect to oxygen). The combustion gas can be added unswirled or swirled.

A smaller part of the combustion gas (the remainder) can be used for injection of the sulphur compound into the combustion zones and/or for cooling the nozzles. For injection of the sulphur compound and/or for cooling the nozzles, air or preferably a gas can also be used which has a lower fraction of oxygen than the combustion gas. As what is termed injection gas and/or nozzle-cooling gas, reaction gas preferably at least in part recirculated and containing $SO_2$ or (if present) another $SO_2$-containing gas having a low oxygen content is used (for details see below).

In a preferred embodiment, unreacted amounts of sulphur dioxide and/or oxygen are added to the combustion gas, i.e. some of the reaction gas is circulated. Advantages result on the one hand owing to the dilution of the combustion gas (on recirculation of a gas having a lower content of oxygen than in the combustion gas) and the lower local temperature accompanying thereby in the combustion (e.g. cooling effects at nozzles), and on the other hand owing to the improved utilization of the starting materials.

On each recirculation, not only the recirculation of some of the reaction gas directly downstream of the combustion, but also—in the case of subsequent further oxidation of the reaction gas to $SO_3$—the recirculation of unreacted amounts of $SO_2$ and/or $O_2$ downstream of the absorption and/or condensation of $SO_3$ is conceivable. Recirculated gas is here generally called cycle gas.

In the direction of flow, the combustion chamber is divided as described above into at least two combustion zones. The number of the combustion zones is preferably in the range from 2 to 8, particularly preferably in the range from 2 to 5. In the combustion zones, injection sites are situated for feeding the sulphur compound. The combustion apparatus is designed in such a manner that the sulphur compound, after entry into the combustion zones, ignites therein.

The ignition stability can be ensured by various measures. It is, for example, conceivable to preheat the combustion gas to a temperature above the ignition temperature of the sulphur compound. It is conceivable to mix the combustion gas with hot cycle gas in order to achieve a temperature above the ignition temperature. It is equally conceivable that the combustion gas has a temperature below the ignition temperature of the sulphur compound, and the flame is stabilized by a recirculation zone. In the recirculation zone, a backflow forced by flow conditions from the hot reaction gas back to the flame route occurs. This forced backflow can be effected by external recirculation zones in the case of unswirled flame or by internal recirculation zones in the case of a swirled flame.

Usually, the sulphur compound is injected into the combustion zones via suitable nozzles. For sulphur or other liquid sulphur-containing streams, the use of a commercially conventional nozzle (internally mixing or externally mixing) is conceivable. Sulphur is usually added to the combustion chamber in liquid form. As atomizing medium, preferably a gas is used which has a moderate oxygen content. This can be, for example, air or cycle gas, or a mixture of combustion gas and cycle gas. The local flame temperature in the vicinity of the nozzle is reduced thereby and damage to the nozzle tip is avoided.

For feeding gaseous sulphur compounds such as, for example, hydrogen-sulphide-containing gases having a hydrogen sulphide fraction of at least 30 mol %, a feed pipe in which the axial intake velocity into the combustion chamber is preferably >10 m/s, particularly preferably >20 m/s, is suitable. Such feed pipes shall be termed here nozzles.

In a preferred embodiment, the nozzle for adding a sulphur compound from the outside is cooled with a gas that has a lower oxygen content than the combustion gas, preferably cycle gas (see FIG. 3 and FIG. 4); also, the use of air or $SO_2$-containing gas streams having a low oxygen content (e.g. off-gas of calcination plants or regenerator of the Fluid Catalytic Cracker) is conceivable. This makes possible combustion with a combustion gas at a high oxygen concentration without destruction of the nozzles owing to high temperatures. The local flame temperature in the vicinity of the nozzle is reduced to the extent that there is no damage to the nozzle tip, i.e. the intense liberation of heat is separated from the immediate injection site.

For better mixing and for generating a shorter flame length, in gaseous sulphur compounds the inner stream is swirled in the nozzle, preferably by a suitable device (see, for example, EP1526129A1).

Surprisingly, it has been found that complete exhaustive combustion of the sulphur compound, as is demanded in the prior art, is not necessary. Experiments have found that sulphur residues remaining in the combustion apparatus do not have any adverse effects. Therefore, the dimensioning of the combustion apparatus according to the invention, in particular the combustion zones, is performed only in such a manner that ignition and flame stability are achieved, and not to ensure complete exhaustive combustion in the combustion zone. This leads to a reduction of the residence time in the particularly hot flame zones and thereby to a reduced formation of thermal $NO_x$. Furthermore, the combustion apparatus can be configured so as to be smaller.

If, for example, sulphur or $H_2S$ and $O_2$ in pure form are reacted with one another, the adiabatic flame temperature is about 3000° C. According to the invention, the flame temperature is set to a value of a maximum of 2000° C.

Via the amount of sulphur compound introduced into the main gas stream per unit time and the design of the cooling means (wall cooling and/or intercooling), the heat development can be controlled in each combustion zone. In this case the metering of the sulphur compound into each combustion zone and the heat removal in and between the combustion zones is set in such a manner that the maximum temperature in each combustion zone does not exceed 2000° C.

Figure 5:
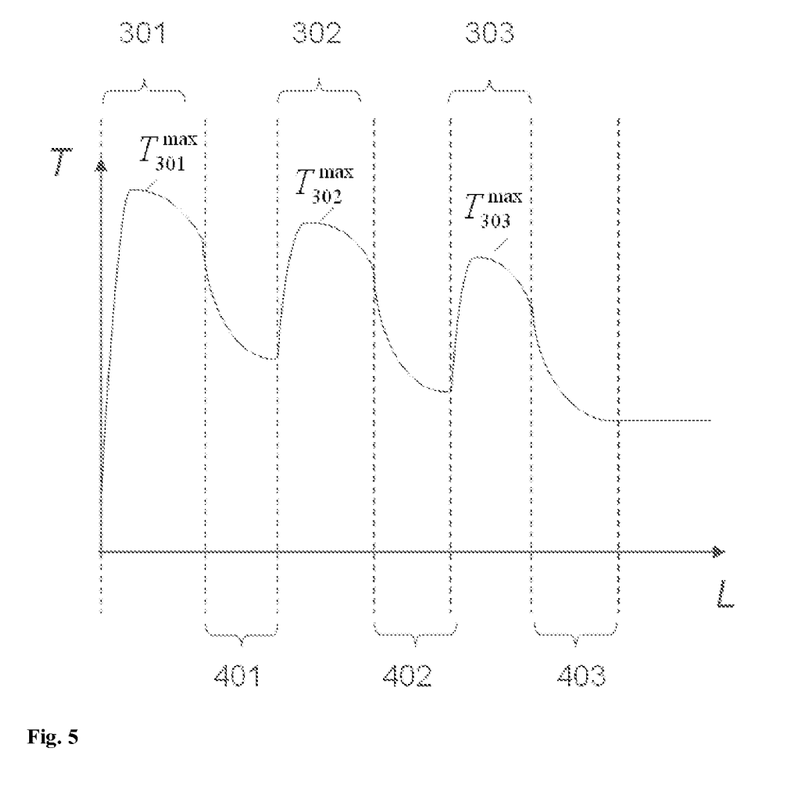
FIG. 5 shows the temperature profile in the combustion chamber in the direction of flow along a ling L which leads through the combustion chamber in parallel to a longitudinal section.

In addition, the process according to the invention is characterized in that the peak temperatures become less in the direction of flow from combustion zone to combustion zone, i.e. in the direction of flow a gradient is established with respect to the maximum temperature (see FIG. 5). Thus, for example in a first combustion zone which the main gas stream passes through as the first zone, preferably the highest mass flow rate with respect to the sulphur compound is established, which leads to a highest maximum temperature in the combustion chamber. This highest maximum temperature is 2000° C. or below. The maximum temperature in the first combustion zone is preferably in the range from 1000° C. to 2000° C., particularly preferably in the range from 1600° C. to 1900° C. In the following combustion zones in the direction of flow of the main gas stream, the maximum temperature is successively reduced.

Since the combustion proceeds in all combustion zones in an oxygen excess, the fraction of feedstocks in the starting material that contain bound nitrogen (e.g. $NH_3$, organic N compounds), should be kept as low as possible in order to prevent the formation of $NO_x$), from bound nitrogen.

The formation of $NO_x$ from bound nitrogen can be substantially suppressed by reducing conditions prevailing locally in a combustion zone. In a preferred embodiment of the invention in which a sulphur-containing feedstock is to be burnt proportionately with bound nitrogen, this nitrogen-containing feedstock is metered into the first combustion zone in such a manner that reducing conditions prevail in the flame. This means that less oxygen is present in the flame than is necessary for complete combustion of the sulphur- and nitrogen-containing feedstocks (substoichiometric conditions with respect to oxygen). In this case, in the combustion zone in the middle, and in particular at the end, of the combustion zone (seen in the direction of flow), superstoichiometric conditions with respect to oxygen prevail and the reducing conditions are restricted locally to the flame. These reducing conditions in the flame suppress the formation of nitrogen oxides. The first combustion zone is followed by one or more further combustion zones in which sulphur compounds are added and burnt that have no fraction, or only a negligible fraction, of bound nitrogen and where no local reducing conditions in the flame are required.

The reducing conditions in the flame can be generated, for example, by using what are called low-$NO_x$-burners which are adequately known to those skilled in the art of combustion and energy technology (see, e.g., Prabir Basu et al., Boilers and Burner: Design and Theory, Mechanical Engineers Series, Springer-Verlag, 2000, chapter 9-9).

On account of the higher combustion temperatures of up to 2000° C., in the presence of molecular nitrogen ($N_2$, e.g. proportionately in the combustion gas), the fraction of thermally formed $NO_x$ can also be significant. Therefore, it can be necessary to add a sulphur compound to the reaction gas in the last combustion zone in order to reduce $NO_x$ present. As sulphur compound, for example, sulphur or $H_2S$ comes into consideration; preferably, sulphur is used.

The selective non-catalytic reduction of $NO_x$ via sulphur has already been detected in adiabatic combustion chambers and used in a non-adiabatic combustion chamber in the very narrow temperature window of 500° C. to 700° C. (see, e.g., EP1295849A2). Surprisingly, it has been found that the selectively-reducing activity of the sulphur is effective over a wide temperature range, in such a manner that it can be used for the combustion process according to the invention in a non-adiabatic combustion apparatus. This is achieved preferably by adding sulphur in the last combustion zone seen in the direction of flow, in which combustion temperatures prevail in the range 400° C. to 1200° C., preferably in the range 600° C. to 1000° C., particularly preferably above 700° C. and below 1000° C.

Usually the reaction gas leaves the combustion chamber with a temperature of 300° C. to about 420° C. The reaction gas here substantially comprises $SO_2$, $O_2$ and $N_2$ and can also contain, e.g., fractions of water, $SO_3$ and $CO_2$.

The ratio of oxygen to sulphur dioxide in the reaction gas that leaves the combustion apparatus is preferably in a volumetric ratio of 0.2 to 1.5, preferably 0.5 to 0.9.

The process according to the invention and the device according to the invention are suitable for the combustion of differing sulphur compounds, which can also be burnt together.

In a preferred embodiment, a sulphur compound having bound nitrogen (preferably Sour Water Stripper Gas, SWSG), a hydrogen-sulphide-containing gas (preferably Amine Acid Gas, AAG) and elemental sulphur are burnt together. The nitrogen-containing feedstock and the hydrogen-sulphide-containing gas or a part thereof are metered into the first combustion zone. For combustion of the nitrogen-containing feedstock, a low-$NO_x$ burner is used, in order to suppress the formation of $NO_x$ from the bound nitrogen. Reducing conditions prevail in the flame of the low-$NO_x$ burner, whereas in the remaining combustion zone an oxygen excess is present. The first combustion zone can be followed by further combustion zones in which hydrogen-sulphide-containing gas is burnt. In the last combustion zone, elemental sulphur is added, in order to reduce $NO_x$ formed in the combustion (from $N_2$ and/or from bound nitrogen). Via this stepwise combustion, a reaction gas is obtained having a high fraction of $SO_2$ and low fractions of $NO_x$. If, for example, SWSG is used as nitrogen-containing feedstock and AAG as hydrogen-sulphide-containing gas, the energy input introduced into the combustion apparatus via SWSG should make up at most 30% of the total energy input introduced into the combustion apparatus via sulphur compounds.

In a further preferred embodiment, in addition to one or more sulphur compounds, sulphur-dioxide-containing streams are fed to the combustion apparatus, which sulphur-dioxide-containing streams must be thermally treated in order to oxidize the interfering components present therein (e.g. carbon monoxide or organic components). These streams can be, for example, off-gases of the regenerator of a Fluid Catalytic Cracker in the petroleum-processing industry, from calcination processes or from sulphuric acid cracking plants. The sulphur-dioxide-containing gases usually have a comparatively low oxygen content and therefore lead to a dilution of the combustion gas, which can be advantageous for the temperature profile in the combustion apparatus. The off-gases are thus fed to a meaningful use.

The invention will be described in more detail hereinafter with reference to further examples, without, however, being restricted thereto.

Figure 1A:
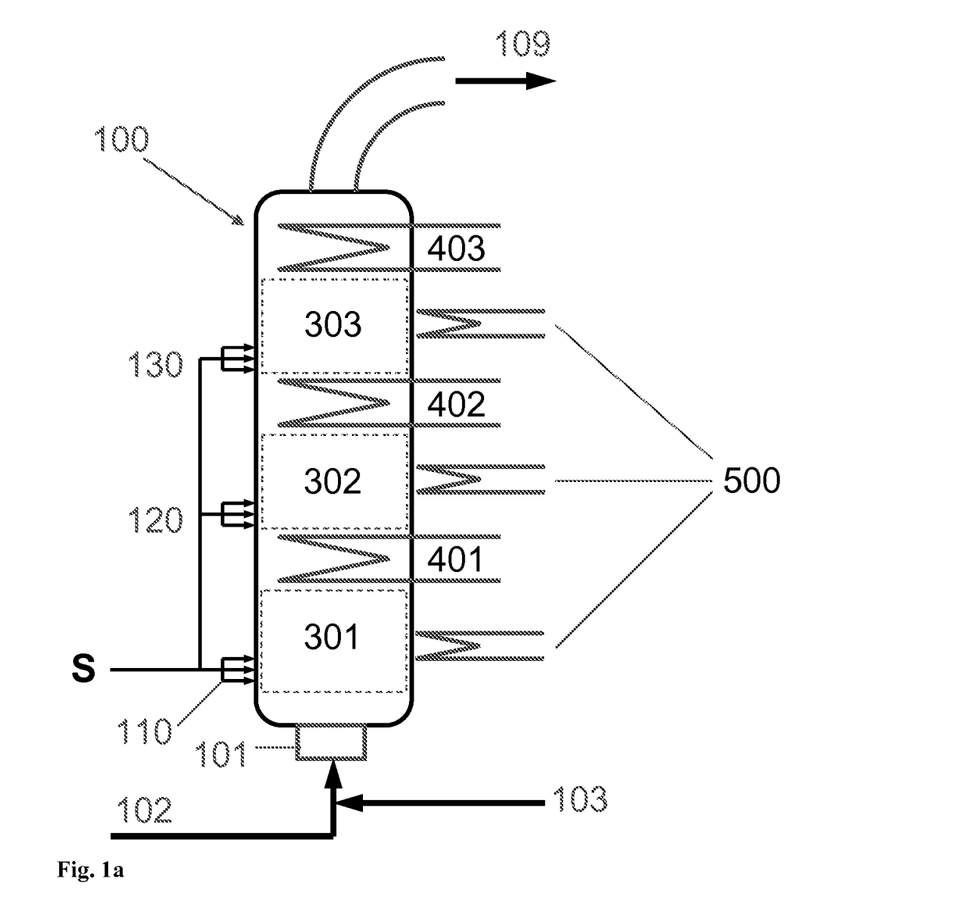
FIGS. 1a-c show schematically embodiments of the combustion apparatus according to the invention.

FIG. 1a shows schematically a preferred embodiment of the combustion apparatus 100 according to the invention. Via a lower inlet (101), the $O_2$-containing combustion gas (102) is conveyed into the combustion apparatus. To this main gas stream, unreacted components from the process according to the invention or from the processes downstream of the process according to the invention can be added (cycle gas 103). The feed of the sulphur compound (S) proceeds along the direction of flow in three successive combustion zones (301, 302, 303, shown by dashed lines). The feed of the sulphur compound (S) proceeds in this process at the side in each case (110, 120, 130). As described above, for the injection of liquid sulphur compounds and for nozzle cooling likewise, cycle gas can be used by way of example (not explicitly shown in the figure). The combustion zones are constructed so as to be non-adiabatic, which in the present case is achieved, inter alia, by wall cooling (500). Between the combustion zones, in addition, heat exchangers are arranged for cooling (401, 402). Subsequently to the last combustion zone (303) a further cooling (403) proceeds, before the reaction gas (109) leaves the combustion apparatus according to the invention.

Figure 1B:
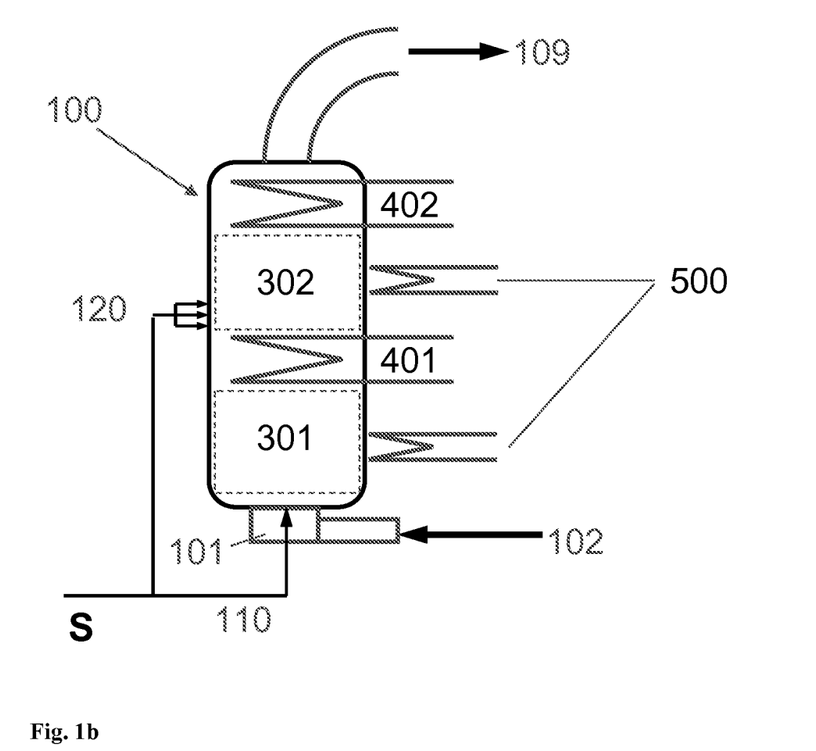

FIG. 1b shows schematically a further preferred embodiment of the combustion apparatus 100 according to the invention. Via a lower inlet (101), the $O_2$-containing combustion gas is conveyed into the combustion apparatus. The sulphur compound (S) is fed into two combustion zones (301, 302, shown by dashed lines) following one another in the direction of flow. The sulphur compound (S, 110) is fed in this process in the first combustion zone (301) centrally in the feed (101) of the combustion gas and in the side (S, 120) of the second combustion zone. As described above, for the injection, liquid sulphur compounds can be used and for nozzle cooling, cycle gas can be used by way of example (not explicitly shown in the figure). The combustion zones are designed to be non-adiabatic, which in the present case, is effected, inter alia, by wall cooling (500). Between the combustion zones, in addition, a heat exchanger is arranged (401) for cooling. Subsequently to the last combustion zone (302), a further cooling (402) proceeds, before the reaction gas (109) leaves the combustion apparatus according to the invention.

Figure 1C:
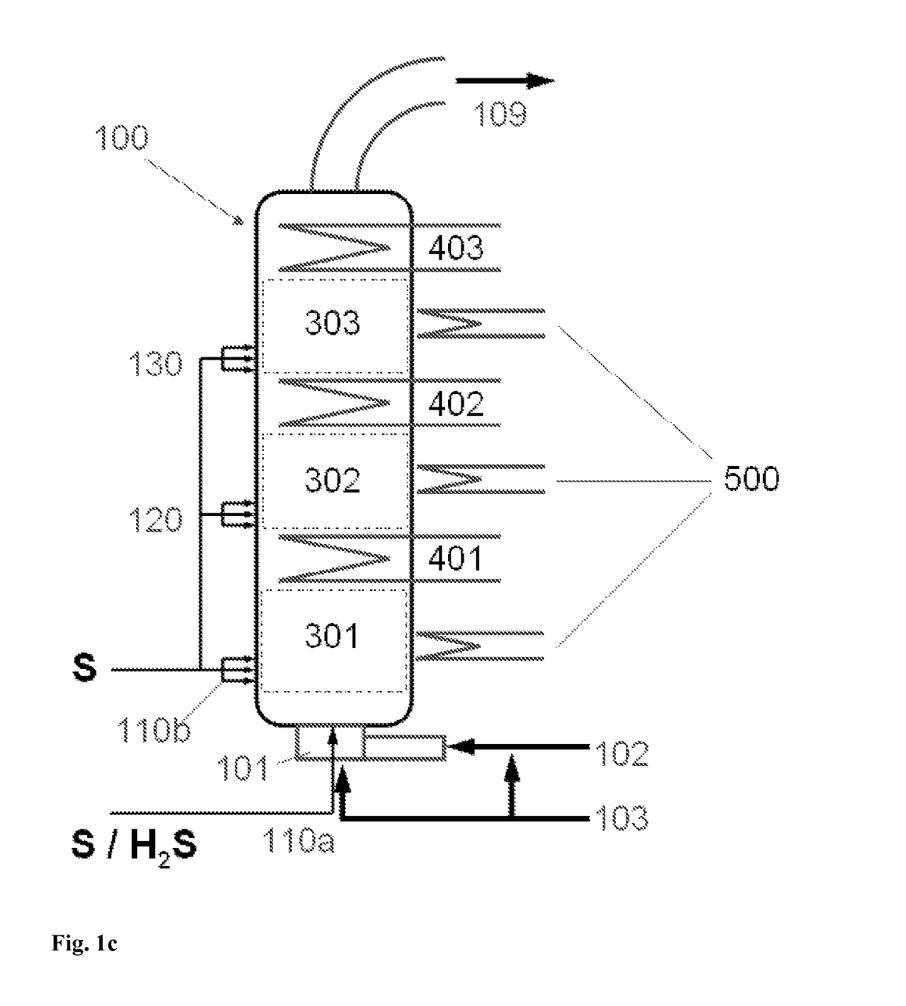

FIG. 1c shows schematically a further preferred embodiment of the combustion apparatus 100 according to the invention. Via a lower inlet (101), the $O_2$-containing combustion gas (102) is conveyed into the combustion apparatus. Unreacted components from the process according to the invention or from processes downstream of the process according to the invention can be added to this main gas stream or fed separately via the lower inlet (101) (cycle gas 103). The feed of some of the sulphur compounds (S/$H_2S$, 110a) proceeds in this case in the first combustion zone (301) centrally in the feed (101) of the combustion gas or at the side (S, 110b), and in the further combustion zones, in each case at the side (S, 120, 130). As described above, a plurality of different sulphur compounds (e.g. sulphur compounds having bound nitrogen, sulphur compound without bound nitrogen, liquid sulphur) can be fed (not shown explicitly in the figure), and for the injection of liquid sulphur compounds, and for nozzle cooling, e.g. cycle gas can be used (not shown explicitly in the figure). The combustion zones are constructed so as to be non-adiabatic, which in the present case is effected inter alia by wall cooling (500). Between the combustion zones, in addition, heat exchangers are arranged for cooling (401, 402). Subsequently to the last combustion zone (303), further cooling (403) proceeds, before the reaction gas (109) leaves the combustion apparatus according to the invention.

Figure 2:
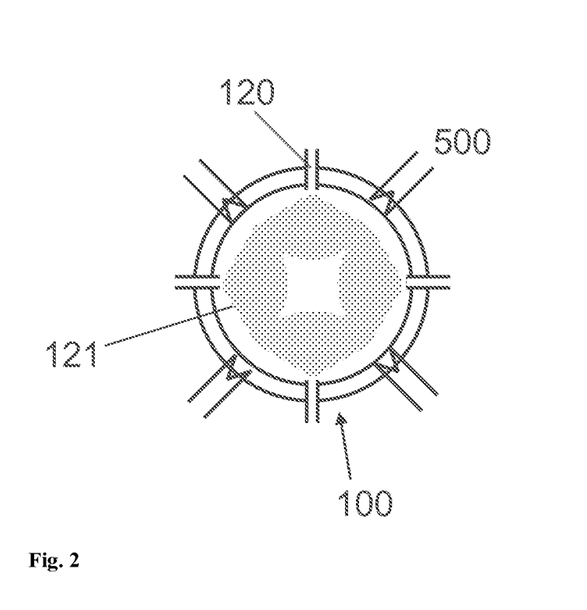
FIG. 2 shows a cross-section through the combustion apparatus shown in FIGS. 1a-c at the height of the side injection sites for the sulphur compound.

FIG. 2 shows a cross section through the combustion apparatus 100 shown in FIG. 1a, FIG. 1b and FIG. 1c at the height of the side injection sites (120) for the sulphur compound S. Four nozzles are present which lead to a fan-shaped injection of the sulphur compound. The wall cooling 500 is likewise shown schematically.

Figure 3:
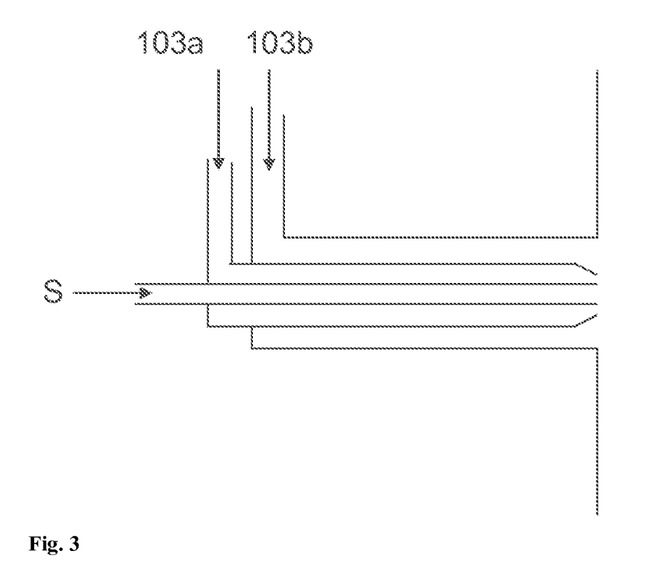
FIG. 3 shows schematically an embodiment of a nozzle for atomizing liquid sulfur into the combustion chamber.
Figure 4A:
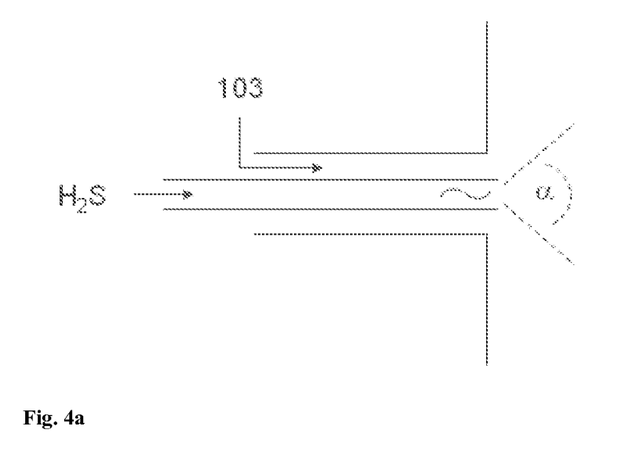
FIG. 4a shows schematically an embodiment of a nozzle for metering hydrogen sulphide into the combustion chamber.
Figure 4B:
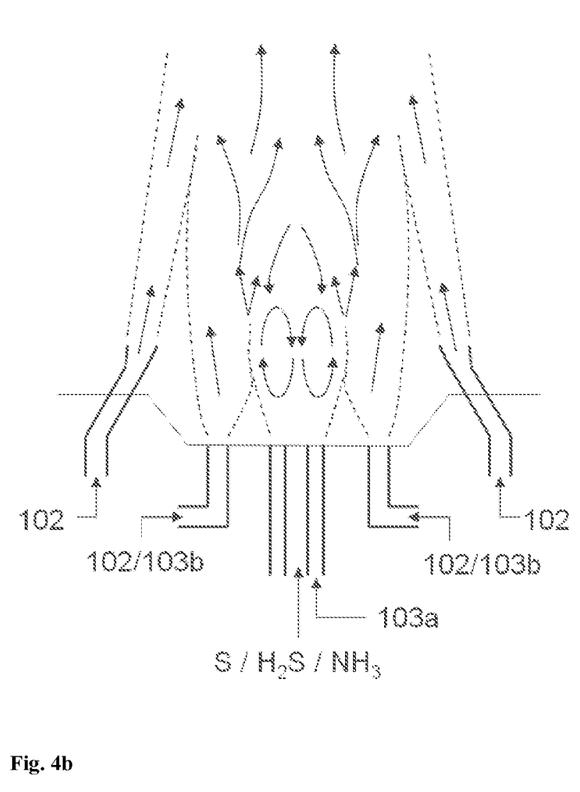
FIG. 4b shows schematically an embodiment of the inlet for the combustion gas through which, centrally, a sulphur-containing stream comprising bound nitrogen ($S/H_2S/NH_3$) is also added.

FIG. 3 shows schematically a preferred embodiment of a nozzle for atomizing liquid sulphur into the combustion chamber. For the atomization, in the present example, cycle gas (103a) is used (e.g. at an overpressure of 1 to 3 bar). The nozzle in addition is externally cooled with cycle gas (103b) (e.g. at an overpressure of <100 mbar).

FIG. 4a shows schematically a preferred embodiment of a nozzle for metering hydrogen sulphide into the combustion chamber. A spin body is introduced into the feed pipe, which spin body leads to an expansion of the gas entry cone α.

FIG. 4b shows schematically a preferred embodiment of the inlet (101) for the combustion gas (102), through which, centrally, a sulphur-containing stream comprising bound nitrogen (S/H$_2$S/NH$_3$) is also added. This embodiment is constructed in a similar manner to a low-NO$_x$ burner, to the extent that the addition of the oxygen-containing combustion gas (102) and cycle gas (103) proceeds directly in a stepped manner at the burner.

FIG. 5 shows the temperature profile in the combustion chamber in the direction of flow along a line L which leads through the combustion chamber in parallel to a longitudinal section. First, the temperature T increases in the first combustion zone 301 to a maximum value $T_{301}^{max}$. This maximum value is kept by cooling to a value of ≦2000° C. Downstream of the combustion zone 301 is an intensive intercooling 401 which leads to a further temperature lowering. The temperature then increases in the second combustion zone 302 to a maximum value $T_{302}^{max}$ which is below $T_{301}^{max}$. Downstream of the combustion zone 302 is an intensive cooling (402); the temperature falls. In the third combustion zone 303, the reaction gas finally reaches a maximum temperature $T_{303}^{max}$, which is below $T_{302}^{max}$. Before the reaction gas leaves the combustion apparatus, it is again cooled (403). It may be noted that the temperature profile varies over the cross section of the combustion apparatus; thus the temperatures close to the walls of the combustion apparatus are markedly lower owing to the wall cooling.

EXAMPLE 1

Combustion of Sulphur with Air

Hereinafter, as a working example of the process according to the invention, the result of a numerical calculation for burning sulphur with air is described.

As starting materials, 10 t/h of sulphur and 79 t/h of dried air are fed to a combustion apparatus according to the invention having two combustion zones (compare FIG. 1b), wherein for the example the mass stream of air at the entry of the combustion apparatus and the mass stream of sulphur fed to the first and second zones are in the ratio 9.0:1.0.

A small part of the combustion air (1.5 t/h) is used for injecting the sulphur. The use of a cycle gas is not required, but is possible in principle.

At the outlet of the combustion apparatus, 89 t/h of SO$_2$-containing gas mixture are obtained, which comprises 22.5% by weight SO$_2$, 9.5% by weight O$_2$ and 68% by weight N$_2$, and additionally other components.

The SO$_2$-containing gas mixture obtained is cooled to 420° C. and can be fed, e.g. to further process steps for producing sulphuric acid.

In the configuration of apparatus according to the invention, the critical advantage is shown compared with conventional combustion apparatuses for burning sulphur with air: the combustion apparatus according to the invention succeeds without upstream combustion chambers, and so the capital costs (for the combustion chambers) and also the structure volume (residence time and space requirement) are markedly lower than in conventional designs.

EXAMPLE 2

Combustion of Sulphur with Oxygen

Hereinafter, as a working example of the process according to the invention, the result of a numerical calculation for burning sulphur with oxygen is described.

As starting materials, 10 t/h of sulphur and 15.2 t/h of oxygen having a volume fraction of 99.5% oxygen and 0.5% nitrogen are fed to a combustion apparatus according to the invention having three combustion zones, wherein for the example the mass stream of oxygen at the entry of the combustion apparatus and the mass stream of sulphur fed to the first, second and third zones are in the ratio 5.7:3.8:0.5.

In addition, 10.2 t/h of cycle gas are fed to the combustion gas, which cycle gas comprises 46% by weight O$_2$, 15% by weight N$_2$, 37% by weight SO$_2$, and also fractions of Ar, CO$_2$ and SO$_3$, and additionally other components. A further 1.5 t/h of cycle gas are used for atomizing the sulphur and a further 1.2 t/h of cycle gas as nozzle cooling gas.

At the outlet of the combustion apparatus, 38.1 t/h of an SO$_2$-containing gas mixture are obtained, which comprises 64.9% by weight SO$_2$, 29.2% by weight O$_2$, 5.3% by weight N$_2$ and additionally other components.

The SO$_2$-containing gas mixture obtained is cooled to 430° C. and fed to further processing steps for producing sulphuric acid in which the SO$_2$ present is 80% converted to SO$_3$ in a first step in a tube-contact apparatus (see, e.g., WO2008/052649A1), and so at the exit of the tube-contact apparatus, a gas mixture comprising 64.9% by weight SO$_3$, 13.0% by weight SO$_2$, 16.2% by weight O$_2$ and in addition other components is present at 500° C. Some of this gas (12.9 t/h) is recirculated to the combustion apparatus as cycle gas.

EXAMPLE 3

Burning Hydrogen-Sulphide-Containing Gases with Air

Hereinafter, as a working example of the process according to the invention, the result of a numerical calculation for burning 6.1 t/h of Amine Acid Gas having a composition of 85 mol % H$_2$S, 7 mol % H$_2$O, 5 mol % CO$_2$ and 3 mol % CH$_4$, in addition 0.8 t/h of Sour-Water-Stripping Gas having a composition of 33 mol % H$_2$S, 33 mol % H$_2$O, 33 mol % NH$_3$ and 1 mol % CH$_4$ and 0.2 t/h liquid sulphur in the combustion apparatus according to the invention having three combustion zones is described. The combustion gas used is 52 t/h combustion air having an oxygen fraction of 21 mol % and a nitrogen fraction of 79 mol %.

In the combustion apparatus, complete oxidation of the starting material gases takes place, and so at the outlet of the combustion chamber, 59.1 t/h of SO$_2$-containing gas mixture (104) are obtained which comprises 9.0 mol % SO$_2$, 11.4 mol % H$_2$O, 5.1 mol % O$_2$, 0.1 mol % CO$_2$ and 73.7 mol % N$_2$.

The combustion apparatus according to the invention is configured and operated in this case in such a manner that the concentration of nitrogen oxides is low (<100 ppm). This is achieved by dividing the feed of the starting material gases: 100% of the Sour-Water-Stripper Gas and 60% of the Amine Acid Gas are passed into the first combustion zone centrally through the inner inlet for the combustion air. Amine Acid Gas is introduced into the second combustion zone. All of the sulphur is injected into the third combustion zone. The combustion air is divided at the inlet into the first combustion zone in such a manner that in the flame, reducing conditions prevail with an air index of 0.9. For atomizing the sulphur, 40 kg/h of the total combustion air are used, and for nozzle cooling 600 kg/h of the total combustion air.

The $SO_2$-containing process gas leaves the combustion apparatus with a temperature of 300 to 350° C. and is fed to downstream process steps (e.g. an absorption-regeneration process for concentrating $SO_2$).

EXAMPLE 4

Combustion of Hydrogen-Sulphide-Containing Gases with Oxygen

Hereinafter, as a working example of the process according to the invention, the result of a numerical calculation for combustion of 6.1 t/h of Amine-Acid Gas having a composition of 85 mol % $H_2S$, 7 mol % $H_2O$, 5 mol % $CO_2$ and 3 mol % $CH_4$, 0.8 t/h of Sour-Water-Stripping Gas having a composition of 33 mol % $H_2S$, 33 mol % $H_2O$, 33 mol % $NH_3$, and 1 mol % $CH_4$, 0.2 t/h of liquid, elemental sulphur and 12.2 t/h of combustion gas having a mass fraction of 99.5% oxygen and 0.5% nitrogen in a combustion apparatus having three combustion zones is described.

In addition, 8.2 t/h of recirculated gas are added to the combustion chamber, which recirculated gas comes, for example, from the first absorption stage of a sulphuric acid plant having a tube-contact apparatus and has a composition of 36.6 mol % $O_2$, 35.0 mol % $CO_2$, 15.7 mol % $N_2$, 12.7 mol % $SO_2$, and also traces of other components.

In the combustion apparatus, complete oxidation of the starting material gases takes place, and so at the outlet of the combustion chamber, 30.1 t/h of an $SO_2$-containing gas mixture are obtained which comprises 29.3 mol % $SO_2$, 31.8 mol % $H_2O$, 22.6 mol % $O_2$, 11.2 mol % $CO_2$, 5.1 mol % $N_2$ and traces of other components. The combustion apparatus according to the invention is configured and operated in this case in such a manner that the concentration of nitrogen oxides is low (<100 ppm). This is achieved by dividing the feed of the starting material gases: 100% of the Sour-Water-Stripper Gas and 50% of the Amine Acid Gas are passed into the first combustion zone centrally through the lower inlet. Virtually all of the cycle gas (total amount minus atomization and nozzle-cooling gas, see below) is introduced into the first combustion zone around the sulphur-containing gases, in turn the combustion gas is added at the lower inlet so as to enclose the sulphur-containing gases. The remaining Amine Acid Gas is introduced into the second combustion zone. All of the sulphur is injected into the third combustion zone. For atomization of the sulphur, 40 kg/h of cycle gas are used, and as nozzle-cooling air, 600 kg/h of cycle gas are used.

The heat removed is used for generating heating steam and superheated steam for power generation via a turbine. In this case an amount of heat of approximately 25 WM is liberated, which is used for generating approximately 30 t/h of high-pressure steam (30 bar).

The $SO_2$-containing flue gas leaves the combustion apparatus at a temperature of 300 to 350° C. and is passed on, for example, in a downstream plant for sulphuric acid production.

REFERENCE SIGNS

100 Combustion apparatus
101 Inlet for combustion gas
102 Combustion gas
103 Recirculated gas from the process (cycle gas)
109 Reaction gas
110 Injection sites for sulphur compound
120 Injection sites for sulphur compound
121 Injected sulphur compound
130 Injection sites for sulphur compound
301 Combustion zone
302 Combustion zone
303 Combustion zone
401 Intercooling
402 Intercooling
403 Heat exchanger (superheater)
500 Wall cooling

The invention claimed is:

1. A process for combustion of at least one sulphur compound, said process comprising:
    passing combustion gas through a combustion apparatus which comprises at least two combustion zones following one another in a direction of flow of the combustion gas, wherein, in each combustion zone at least one sulphur compound is injected into the combustion gas, wherein each combustion zone is cooled, and wherein, downstream of each combustion zone, a heat exchanger is connected via which reaction gas is cooled in such a manner that a maximum temperature in each combustion zone does not exceed 2000° C.,
    wherein at least one nozzle for injecting said at least one sulphur compound into said combustion zones are externally cooled by a gas that has a concentration of oxygen which is lower than the concentration of oxygen in said combustion gas entering into said combustion apparatus, and wherein the gas enters into said combustion zones and leads to a reduction of the concentration of oxygen in the immediate vicinity of a tip of the nozzle.

2. A process for combustion of at least one sulphur compound, said process comprising:
    passing combustion gas through a combustion apparatus which comprises at least two combustion zones following one another in a direction of flow of the combustion gas, wherein, in each combustion zone at least one sulphur compound is injected into the combustion gas, wherein each combustion zone is cooled, and wherein, downstream of each combustion zone, a heat exchanger is connected via which reaction gas is cooled in such a manner that a maximum temperature in each combustion zone does not exceed 2000° C.,
    wherein a cycle gas containing sulphur dioxide and oxygen is fed to said combustion gas.

3. The process according to claim 1, wherein the fraction of oxygen in said combustion gas which is fed to the combustion apparatus is at least 20%.

4. The process according to claim 1, wherein the gas with a lower concentration of oxygen comprises cycle gas or air.

5. The process according to claim 1, wherein injection of said at least one liquid sulphur compound proceeds using a gas that has a lower oxygen content than said combustion gas.

6. The process according to claim 1, wherein said maximum temperature decreases in said combustion zones successively following one another in the direction of flow of said combustion gas.

7. The process according to claim 1, wherein a sulphur compound is added to the reaction gas in a last combustion zone, in order to reduce NOx present.

8. The process according to claim 1, wherein a sulphur compound having bound nitrogen, a hydrogen-sulphide-containing gas and elemental sulphur are burnt together, wherein said nitrogen-containing sulphur compound and at least some of said hydrogen-sulphide-containing gas are added to a first combustion zone, whereas elemental sulphur is added to a last combustion zone.

9. The process according to claim 1, wherein, in addition to said at least one sulphur compound, a sulphur-dioxide-containing gas which comprises oxidizable components is fed to said combustion apparatus.

10. A combustion apparatus for continuous combustion of at least one sulphur compound with the formation of sulphur dioxide, said apparatus at least comprising:
an inlet for feeding an oxygen-containing combustion gas,
an outlet for reaction gas produced, and
at least two combustion zones between the inlet and the outlet, wherein said combustion zones are provided with at least one nozzle for injection of said at least one sulphur compound into said combustion zones, wherein said combustion zones can be cooled, and wherein downstream of each said combustion zone, is connected a heat exchanger for cooling said reaction gas, wherein said nozzles can be externally cooled using a gas which can enter into said combustion zones and can reduce a concentration of oxygen in the immediate vicinity of at least one tip of said nozzle in comparison with said concentration of oxygen of the combustion gas entering said combustion apparatus.

11. Combustion apparatus according to claim 10, wherein said combustion apparatus is provided with means for recirculating an unreacted amount of sulphur dioxide and/or oxygen into said combustion gas.

12. The process according to claim 1, wherein the at least one sulphur compound comprises sulphur and/or a hydrogen-sulphide containing gas.

13. The process according to claim 3, wherein the fraction of oxygen in said combustion gas which is fed to the combustion apparatus is at least 40%.

14. The process according to claim 3, wherein the fraction of oxygen in said combustion gas which is fed to the combustion apparatus is at least 70%.

15. The process according to claim 3, wherein the fraction of oxygen in said combustion gas which is fed to the combustion apparatus is at least 90%.

16. The process according to claim 3, wherein the fraction of oxygen in said combustion gas which is fed to the combustion apparatus is at least 95%.

17. The process according to claim 5, wherein the gas with a lower concentration of oxygen than said combustion gas comprises cycle gas or air.

18. The process according to claim 7, wherein the sulphur compound is sulphur.

19. The combustion apparatus according to claim 10, wherein the at least one sulphur compound comprises sulphur and/or a hydrogen-sulphide containing gas.

* * * * *